United States Patent
Worek et al.

(10) Patent No.: US 10,018,997 B2
(45) Date of Patent: Jul. 10, 2018

(54) NON-INTRUSIVE DATA ANALYTICS IN A PROCESS CONTROL SYSTEM

(71) Applicants: Christopher J. Worek, Austin, TX (US); Terrence L. Blevins, Round Rock, TX (US); Robert B. Havekost, Elgin, TX (US); Dirk Thiele, Austin, TX (US)

(72) Inventors: Christopher J. Worek, Austin, TX (US); Terrence L. Blevins, Round Rock, TX (US); Robert B. Havekost, Elgin, TX (US); Dirk Thiele, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 391 days.

(21) Appl. No.: 13/931,341

(22) Filed: Jun. 28, 2013

(65) Prior Publication Data
US 2015/0005903 A1    Jan. 1, 2015

(51) Int. Cl.
*G05B 13/04* (2006.01)
*G05B 19/418* (2006.01)

(52) U.S. Cl.
CPC .......... *G05B 19/41885* (2013.01); *G05B 2219/31357* (2013.01); *G05B 2219/31472* (2013.01);
(Continued)

(58) Field of Classification Search
CPC ............................................. G05B 19/41885
See application file for complete search history.

(56) References Cited

U.S. PATENT DOCUMENTS 6,662,061 B1 * 12/2003 Brown ............... G05B 17/02
                                                      700/100
7,969,975 B2 *  6/2011 Jiang ................ H04L 12/2825
                                                      370/252
(Continued)

FOREIGN PATENT DOCUMENTS

CN        101446822 A     6/2009
GB        2 496 040 A     5/2013
(Continued)

OTHER PUBLICATIONS

Search Report for Application No. GB1411529.9, dated Jan. 14, 2015.
(Continued)

*Primary Examiner* — Kenneth M Lo
*Assistant Examiner* — David J Wynne
(74) *Attorney, Agent, or Firm* — Marshall, Gerstein & Borun LLP

(57) ABSTRACT

An on-line data analytics device can be installed in a process control system as a standalone device that operates in parallel with, but non-intrusively with respect to, the on-line control system to perform on-line analytics for a process without requiring the process control system to be reconfigured or recertified. The data analytics device includes a data analytics engine coupled to a logic engine that receives process data collected from the process control system in a non-intrusive manner. The logic engine operates to determine further process variable values not generated within the process control system and provides the collected process variable data and the further process variable values to the data analytics engine. The data analytics engine executes statistically based process models, such as batch models, stage models, and phase models, to produce a predicted process variable, such as an end of stage or end of batch (Continued)

quality variable for use in analyzing the operation of the on-line process.

52 Claims, 3 Drawing Sheets

(52) U.S. Cl.
CPC ............... *Y02P 90/14* (2015.11); *Y02P 90/22* (2015.11); *Y02P 90/26* (2015.11)

(56) References Cited

U.S. PATENT DOCUMENTS

| | | | |
|---|---|---|---|
| 8,046,086 B2 | 10/2011 | Pettus et al. | |
| 8,078,434 B2* | 12/2011 | Yelchuru | G05B 19/41875 702/81 |
| 8,132,042 B2* | 3/2012 | Jordan | H04L 69/26 714/4.1 |
| 2009/0048816 A1* | 2/2009 | Srinivasa | C12M 41/48 703/11 |
| 2009/0149981 A1* | 6/2009 | Evans | G05B 23/0254 700/110 |
| 2010/0005336 A1 | 1/2010 | Jordan et al. | |
| 2010/0274367 A1* | 10/2010 | Kaufman | G05B 17/02 700/31 |
| 2010/0318934 A1* | 12/2010 | Blevins | G05B 13/048 715/772 |
| 2011/0276164 A1* | 11/2011 | Bourg, Jr. | G05B 13/042 700/104 |
| 2011/0288660 A1* | 11/2011 | Wojsznis | G05B 23/024 700/30 |
| 2011/0288837 A1* | 11/2011 | Blevins | G05B 17/02 703/6 |
| 2013/0069792 A1* | 3/2013 | Blevins | G05B 23/024 340/815.4 |

FOREIGN PATENT DOCUMENTS

| | | | | |
|---|---|---|---|---|
| JP | 2001-106703 A | 4/2001 | | |
| JP | 2007-188473 A | 7/2007 | | |
| JP | 2011-248885 A | 12/2011 | | |
| WO | WO-2007/095585 A2 | 8/2007 | | |
| WO | WO 2010128354 A1 * | 11/2010 | ............... | D21C 7/12 |

OTHER PUBLICATIONS

Notification of First Office Action for Chinese Application No. 201410301843.5, dated Dec. 20, 2017.

Notice of Reasons for Rejection for Japanese Application No. 2014-132500, dated Mar. 27, 2018.

* cited by examiner

NON-INTRUSIVE DATA ANALYTICS IN A PROCESS CONTROL SYSTEM

FIELD OF THE DISCLOSURE

This patent relates generally to systems and methods for analyzing process control system performance and, more particularly, to a system and method for non-intrusively performing on-line data analytics and modeling within batch and continuous processes.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations (e.g., workstations) which are typically implemented using a personal computer, laptop, or the like and which are communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

Typically, displaying process information in the graphical user interface is limited to the display of a value of each process variable associated with the process. In some cases, methods of performing data analytics on the collected data are used to analyze process operation. For example, some process control systems may characterize simple relationships between some process variables to determine quality metrics associated with the process. While, in some cases, process data analytics can be quite complicated, such process data analytics have, for the most part, been performed off-line, i.e., after the process has been completed. While off-line data analytics are powerful tools used for many years by customers to determine, for example, root causes for quality issues for products, in cases where a resultant product of the process does not conform to predefined quality control metrics, the process and/or other process variables are only analyzed after the completion of a batch, a process, and/or an assembly of the resulting product. While viewing the process and/or quality variables upon the completion of the process enables improvements to be implemented to the manufacturing or the processing of subsequent products, these improvements are not able to remediate the current completed products, which are out-of-specification.

This problem is particularly acute in batch processes, that is, in process control systems that implement batch processes. As is known, batch processes typically operate to process a common set of raw materials together as a "batch" through various numbers of stages or steps (which may defined by one or more stage, phases, or procedures), to produce a product. Multiple stages or steps of a batch process may be performed in the same equipment, such as in a tank, while others of the stages or steps may be performed in other equipment. Because the same raw materials are being processed differently over time in the different stages or steps of the batch process, in many cases within a common piece of equipment, it is difficult to accurately determine, during any stage or step of the batch process, whether the material within the batch is being processed in a manner that will likely result in the production of the end product that has desired or sufficient quality metrics. That is, because the temperature, pressure, consistency, pH, or other parameters of the materials being processed changes over time during the operation of the batch, many times while the material remains in the same location, it is difficult to determine whether the batch processes is operating at any particular time during the batch run in a manner that is likely to produce an end product with the desired quality metrics.

Thus, it is desirable in many instances to be able to perform analytical calculations on-line while a product is being manufactured as opposed to off-line (after a product is complete). On-line and off-line data analytics may use the same calculations, but on-line analytics allow the opportunity for taking corrective action before the product is complete.

One on-line analytical method of determining whether a currently operating batch is progressing normally or within desired specifications (and is thus likely to result in a final product having desired quality metrics) compares various process variable measurements made during the operation of the on-going batch with similar measurements taken during the operation of an exemplary or "golden batch." In this case, a golden batch is a predetermined, previously run batch selected as a batch run that represents the normal or expected operation of the batch and that results in an end product with desired quality metrics. However, batch runs of a process typically vary in temporal length, i.e., vary in the time that it takes to complete the batch, making it difficult to know which time within the golden batch is most applicable to the currently measured parameters of an on-going batch being compared to the golden batch. Moreover, in many cases, batch process variables can vary widely during the batch operation, as compared to those of a selected golden batch, without a significant degradation in quality of the final product, meaning that the ongoing batch may still be operating properly even if process variables differ from the similar variables of the golden batch. Also, it is often difficult, if not practically impossible, to identify a particular batch run that is capable of being used in all cases as the golden batch to which all other batch runs should be compared.

A method of analyzing the results of on-going batch processes that overcomes some of the problems of using a golden batch involves creating a statistical model for the batch and using this statistical model to perform on-line analytics. This technique involves collecting data for each of a set of process variables (batch parameters) from a number of different batch runs of a batch process and identifying or measuring quality metrics for each of those batch runs. Thereafter, the collected batch parameters and quality data are used to create a statistical model of the batch, with the statistical model representing the "normal" operation of the batch that results in desired quality metrics. This statistical model of the batch can then be used on-line during process operation to analyze how different process variable measurements made during a particular batch run statistically relate to the same measurements within the batch runs used to develop the model. For example, this statistical model may be used to provide an average or a median value of each measured process variable, and a standard deviation associated with each measured process variable at any particular time during the batch run to which the currently measured process variables can be compared. Moreover, this statistical model may be used to predict how the current state of the batch will affect or relate to the ultimate quality of the batch product produced at the end of the batch.

Generally speaking, this type of batch modeling requires large amounts of data to be collected from various on-line sources such as transmitters, control loops, analyzers, virtual sensors, calculation blocks and manual entries. Most of the data for previously run batches is stored in continuous data historians. However, significant amounts of data and, in particular, manual entries, are usually associated with process management systems. Data extraction from both of these types of systems must be merged to satisfy model building requirements. Moreover, as noted above, a batch process normally undergoes several significantly different stages, steps or phases, from a technology and modeling standpoint. Therefore, a batch process is typically subdivided with respect to the phases, and a model may be constructed for each phase. In this case, data for the same phase or stage or procedure, from many batch runs, is grouped to develop the statistical model for that phase or stage or procedure. The purpose of such a data arrangement is to remove or alleviate process non-linearities. Another reason to develop separate batch models on a stage basis, a phase basis, a procedure basis, or other basis is that, at various different stages of a batch, different process parameters are active and are used for modeling. As a result, a stage model can be constructed with a specific set of parameters relevant for each particular stage to accommodate or take into account only the process parameters relevant at each batch stage.

Various methods for performing statistically based, on-line data analytics within batch and continuous processes are described in more detail in U.S. Patent Application Publication Nos. 2010/0318934, 2011/0288660, 2011/0288837 and 2013/0069792, which generally describe methodologies for creating and executing on-line process models that enable process variable and process quality estimation, prediction and control. The disclosure of each of U.S. Patent Application Publication Nos. 2010/0318934, 2011/0288660, 2011/0288837 and 2013/0069792 is hereby expressly incorporated by reference herein. Generally speaking, the data analytical models and user interface methods described in these publications can be used to perform on-line and off-line process analysis and may be used to perform on-line process control while a process is executing, to thereby increase the quality of the products being produced by a process as the process is running.

Typically, to provide on-line data analytics, data from the various areas, regions, units, equipment, etc. of the plant must be collected for performing the analytics for each stage or part of a process being modeled during operation of the process being analyzed. The collection of this data may, in many cases, require the collection and processing of data that was not set up to be collected by the controller(s), field devices, batch executives, or other devices or modules within the process in the first place. Thus, in many cases, the addition of on-line data analytics requires an operator or a process configuration engineer to reconfigure the process control system by, for example, modifying the process to incorporate, generate or collect the new variables that are required as inputs for the data analytic models or calculations. For plant operators with a "locked down" or certified control system, making this modification presents a problem as, to do so, the plant operator needs to introduce the control system configuration changes and then re-certify and lock down the system again. This recertification process can be very expensive and time consuming.

SUMMARY

An on-line data analytics system can be installed in a process control system as a standalone device that operates in parallel with, but non-intrusively with respect to, the on-line control system to perform on-line analytics for a process without requiring the process control system to be reconfigured to support the on-line data analysis and thus without requiring the process control system to be recertified. The data analytics device includes a data analytics engine coupled to a logic engine that receives process data collected from the process control system in a non-intrusive manner. The logic engine operates to determine further process variable values not generated within the process control system and provides at least some of the collected process variable data and the further process variable values to the data analytics engine. The data analytics engine executes statistically based predictive process models, such as batch models, stage models, and phase models, to produce a predicted process variable, such as an end of stage or end of batch quality variable for use in analyzing the operation of the on-line process which may be a batch process or a continuous process.

The on-line data analytics machine may include a data analytics engine coupled to a logic engine. In this case, the data analytics engine may be coupled to the process logic engine to receive data from the process logic engine needed by the data analytics engine to execute various process models, such as batch models, stage models, phase models, etc., as part of the on-line analytics, and may otherwise perform data analytics in any known or desired manner. The process logic engine, which may include a simulated control system, receives data from the plant in the form of measured process variables, control signals, alarms, alerts, etc. While the logic engine may contain key variables that are received from the on-line control system of the process and may essentially "mirror" these variables as part of a simulated control system, the logic engine may additionally or alternatively include a process logic execution engine that calculates, develops, simulates or generates values for any new variables required by the data analytics engine but not developed by, measured by or collected within or by the actual plant control system. Such new variables may be, for example, indications of the beginning or ending of a particular batch stage, phase, procedure, etc. or an indication of some other start or stop point in the process associated with one or more predictive models used in the data analytics engine.

The new data analytics machine can thus be configured independently of and separately from the existing control system, and may operate to perform read-only operations with respect to the existing control system when obtaining data from the original or existing control system. As a result, the data analytics machine can be installed and operate on-line with respect to the process control system non-intrusively so that the addition of and the execution of the data analytics machine does not generally require modifying, altering or reconfiguring the on-line control system and, as such, does not require re-certification of the on-line control system upon addition of the data analytics machine. However, the data analytics engine may still operate to perform analytic calculations, and output results in the form of process variable or product quality predictions for the on-line process, all independently of the existing production or control system.

This combined system thus includes an on-line data analytics engine tied to a simulated control system that monitors, mirrors and/or simulates the operation of the existing production system to enable the data-analytics engine to perform on-line analytics for the existing system (which may not be aware of the existence of the external data-analytics engine). This solution works when the same or different versions of a control system are used within the logic engine on one hand and within the process plant control system on the other hand, and even works when different control systems are used as part of the logic engine simulation on one hand and as part of the on-line control system on the other hand.

In one case, a data analysis system for use in analyzing an operation of process plant control equipment within a process plant while the process plant control equipment is operating on-line within the process plant to implement an industrial process includes a data collection device, coupled to the process plant control equipment to collect process variable data from the process plant control equipment as determined or measured within the industrial process while the industrial process is operating on-line, and a process logic engine communicatively coupled to the data collection device that operates on a computer processor to simulate a portion of the operation of the industrial process using the collected process variable data to produce one or more further process variable values. The system also includes a process analytic engine communicatively coupled to the process logic engine, wherein the process analytic engine includes one or more stored data analytic models (in the form of predictive models) that statistically model the operation of the process and a data analytics execution engine that executes a data analytic routine using the one or more data analytic models while the industrial process is operating on-line to determine a predicted process variable for the industrial process using some of the process variable data and the one or more further process variable values while the industrial process is operating on-line.

If desired, the data analysis system may determine the predicted process variable as a predicted process quality value such as, for example, an end-of-stage product quality or an end-of-batch product quality. The process logic engine may include one or more process simulation models and a process simulation engine that executes on a processor to simulate the operation of the industrial process using the one or more process simulation models to produce the one or more further process variable values. The process simulation engine may store the collected process variable values as collected by the data collection device to simulate the operation of the industrial process or may operate one or more simulation models to simulate the operation of the industrial process. The process simulation engine may also store the configuration of the industrial process control system as part of the simulation.

In the case in which the industrial process is a batch process, the one or more data analytic models may include a batch model, two or more stage models and/or two or more phase models defining or associated with different stages or phases of the batch process. In this case, the process logic engine may include a process model that determines the start or the stop of a batch defined by the batch model as one of the one or more further process variable values, a process model that determines the start or the stop of each of two or more stages associated with the two or more stage models as the one or more further process variable values, or a process model that determines the start or the stop of each of two or more phases associated with the phase models as the one or more further process variable values.

In some cases, the data analytic models may includes a projection to latent structures (PLS) model or other statistical prediction model. Additionally, the data collection device, which may be an OPC data collection device, may collect process variables in the form of measured process variables, control signals, alarms and alerts as generated within the industrial process or any other process data measured within, collected within, or generated within the industrial process as part of the configured operation of the industrial process control system.

The data analysis system may further include a model builder engine that develops the one or more data analytic models from past process variable data collected from the industrial process for one or more previous industrial processes or process times and further variable values as determined by the process logic engine for the one or more previous industrial processes or process times. The data analysis system may also include, as part of the process logic engine, a process simulation engine that stores the current configuration of the process control equipment used in the industrial process. The process logic engine may also include a logic builder engine the enables a user to develop one or more logic modules to be implemented on the process logic engine to determine the one or more further process variable values.

In another case, a computer implemented method of analyzing an operation of process plant control equipment within a process plant while the process plant control equipment is operating on-line within the process plant to implement an industrial process includes collecting process variable data from the process plant control equipment as determined or measured within the industrial process while the industrial process is operating on-line and using at least some of the collected process variable data to simulate the operation of the industrial process on a computer processor device to produce one or more further process variable values. The method of analyzing the operation of the process plant control equipment also includes storing one or more predictive data analytic models that statistically model the operation of the process and using a computer processor to implement a data analytic routine using the one or more data analytic models, at least a portion of the collected process variable data and the one or more further process variable values while the industrial process is operating on-line to determine a predicted process variable for the industrial process.

If desired, the analysis method may determine a predicted process variable for the industrial process as a predicted process quality value, such as an end-of-stage product quality or an end-of-batch product quality. Collecting process variable data from the process plant control equipment as determined or measured within the industrial process while the industrial process is operating on-line may include collecting the process variable data without reconfiguring the process control equipment and/or may include collecting process variable data from the process plant control equipment as determined or measured within the industrial process while the industrial process is operating on-line via one or more communications firewalls.

Still further, using at least some of the collected process variable data to simulate the operation of the industrial process may include using one or more process logic routines or one or more process simulation models that operate on the at least some of the collected process variable data to produce the one or more further process variable values The analysis method may further enable a user to develop, using a computer processor, the one or more data analytic models from past process variable data collected from the industrial process for one or more previous industrial processes or process times and further variable values as determined for the one or more previous industrial processes or process times and may enable a user to develop one or more logic modules to be implemented on a computer processor to determine the one or more further process variable values.

In still another case, a process control system for use in controlling an industrial process includes process plant control equipment, in the form of at least a controller and one or more field devices which implement an industrial process, and a data collection device, communicatively coupled to the process plant control equipment to collect process variable data from the process plant control equipment as determined or measured within the industrial process while the industrial process is operating on-line. The process control system also includes a process logic engine communicatively coupled to the data collection device that operates on a computer processor to simulate the operation of the industrial process using some of the collected process variable data to produce one or more further process variable values and a process analytic engine communicatively coupled to the process logic engine. Here, the process analytic engine includes one or more stored data analytic models that statistically model the operation of the process and a data analytics execution engine that executes a data analytic routine using the one or more data analytic models while the industrial process is operating on-line to determine a predicted process variable for the industrial process using a portion of the collected process variable data and the one or more further process variable values while the industrial process is operating on-line.

In this case, the process plant control equipment may be coupled to a first communications network and the process logic engine and the process analytic engine may be coupled to a second communications network, wherein one or more firewalls are disposed between the first communications network and the second communications network. If desired, the data collection device may be coupled to both the first and the second communications networks and may perform read-only operations on the first communications network without performing any write operations on the first communications network. Likewise, a the process plant control equipment may include a data historian connected to the first and the second communications networks that is adapted to or operates to store data generated by and received from devices coupled to the first communications network.

DETAILED DESCRIPTION

Figure 1:
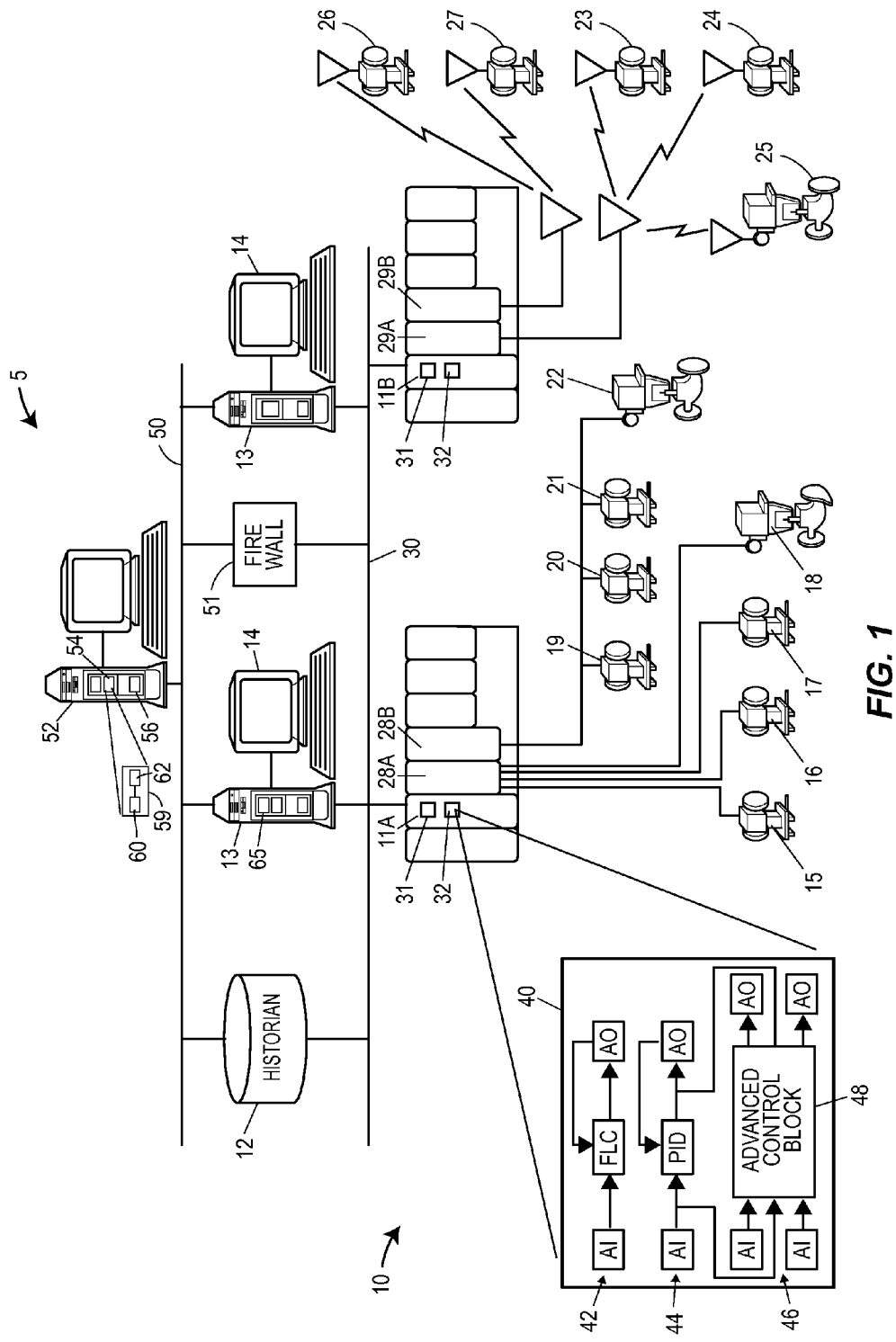
FIG. 1 is a diagram of an isolated data analytics machine coupled to a process control network having a controller and field devices, wherein the data analytics machine may be used to implement on-line or off-line data analytics for batch or continuous processes.

FIG. 1 illustrates an example industrial process plant 5 in which a non-intrusive data analytics machine may be installed and used. The process plant 5 includes an on-line process control system 10 having one or more process controllers (11A and 11B in FIG. 1) connected in a primary plant communications network to a data historian 12 and to one or more host workstations or computers 13 (which may be any type of personal computers, workstations, etc.), each having a display screen 14. The controllers 11A and 11B are also connected to field devices 15-27 via input/output (I/O) cards 28A, 28B and 29A, 29B, and may operate to implement one or more batch runs of a batch process or may implement a continuous process using some or all of the field devices 15-27. The controllers 11, the data historian 12, the computers 13, the I/O devices 28 and 29 and the field devices 15-27 are communicatively coupled to a primary control communications network 30 also referred to herein as an on-line control network.

The data historian 12, which may be any desired type of data collection unit having any desired type of memory and any desired or known software, hardware or firmware for storing data, may be separate from (as illustrated in FIG. 1) or a part of one of the workstations 13. The controllers 11, which may be, by way of example, DeltaV® controllers sold by Emerson Process Management, are communicatively connected to the host computers 13 and to the data historian 12 via, for example, an Ethernet connection or any other desired communication line that is part of the communications network 30. The controllers 11A and 11B may be communicatively connected to the field devices 15-27 using any desired hardware and software associated with, for example, a standard 4-20 ma communications protocol and/or any smart communications protocol such as the FOUNDATION® Fieldbus protocol, the HART® protocol, the WirelessHART® protocol, etc.

In the system of FIG. 1, the controller 11A is illustrated as being connected via the I/O device 28A to 4-20 ma devices, or to HART devices 15-18 via standard wiring, such as wired HART communication lines. Likewise, the controller 11A is illustrated in FIG. 1 as being connected, via the I/O device 28B, to FOUNDATION® Fieldbus devices 19-22 via standard wired Fieldbus links or busses. Also, in the system of FIG. 1, the controller 11B is illustrated as being connected to WirelessHART® field devices 23-25 via the I/O device 29A and transmitters which implement a WirelessHART communication protocol while the controller 11B is connected to other field devices 26, 27 via any other wireless communication protocol, such as an IEEE process control based wireless protocol. However, the controllers 11 may communicate with any other number of and type of field devices using any other desired wired or wireless communication protocols or techniques. Of course, the field devices 15-27 may be any types of devices, such as sensors, valves, transmitters, positioners, etc. Even more particularly, the field devices 15-27 may include any type of process control component that is capable of receiving inputs, generating outputs, and/or controlling a process. For example, the field devices 15-27 be in the form of control or process control input devices such as, for example, valves, pumps, fans, heaters, coolers, and/or mixers to control a process. Additionally, the field devices 15-27 may be in the form of process control output devices such as, for example, thermometers, pressure gauges, concentration gauges, fluid level meters, flow meters, and/or vapor sensors that measure process variables within one or more portions of a process. The input devices may receive instructions from the controllers 11 to execute one or more specified commands and cause a change to the process. Furthermore, the output devices measure process data, environmental data, and/or input device data and transmit the measured data to the controllers 11 or other devices as process control information. This process control information may include the values of variables (e.g., measured process variables and/or measured quality variables) corresponding to a measured output from each field device. Also, the measured process variables may be associated with process control information originating from field devices that measure portions of the process and/or characteristics of the field devices. Measured quality variables may be associated with process control information related to measuring characteristics of the process that are associated with at least a portion of a completed product or an intermediate product.

Still further, the I/O cards 28 and 29 may be any types of I/O devices conforming to any desired communication or controller protocol. Also, while only two controllers 11A and 11B are illustrated in FIG. 1, any other number of controllers could be used to connect to and control any number of field devices using any desired communications protocols, such as Profibus, AS-interface, etc., protocols.

In any event, as is generally the case, the controllers 11A and 11B include processors 31 that implement or oversee one or more process control routines (stored in a memory 32), which may include control loops, and that communicate with the field devices 15-27, the host computers 13 and the data historian 12 to control a process in any desired manner. It should be noted that any of the control routines or modules described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, or function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controllers 11 may be configured to implement one or more control strategies or control routines in any desired manner.

In some embodiments, the controllers 11 implement one or more control strategies using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, neural network, etc. control, or an output function which controls the operation of some device, such as a valve, to perform some physical function within the process control system 10. Of course, hybrid and other types of function blocks exist. Function blocks may be stored in and executed by the controllers 11, which is typically the case when these function blocks are used for, or are associated with standard 4-20 ma devices and some types of smart field devices such as HART devices, or may be stored in and implemented by smart field devices themselves, which can be the case with Fieldbus devices.

As illustrated by the exploded block 40 of FIG. 1, the controller 11A may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other devices within the process control system 10. The advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs. The advanced control block 48 may be, for example, any type of model predictive control (MPC) block, a neural network modeling or control block, a multi-variable fuzzy logic control block, a real-time-optimizer block, an adaptively tuned control block, etc. It will be understood that the function blocks illustrated in FIG. 1, including the advanced control block 48, can be executed by the controller 11A or, alternatively, can be located in and executed by any other processing device, such as one of the workstations 13 or even one of the field devices 19-22. As will be understood, the control loops or control modules 42, 44 and 46 may be associated with or used in implementing batch processes or continuous processes within the process control system 10.

Moreover, as illustrated in FIG. 1, a secondary communications network 50 is coupled to the primary control communications network 30 via, for example, one or more of the computer devices 13, the historian 12 and/or a firewall device 51. The secondary network 50 is isolated from the primary control communications network 30 with the use of, for example, the firewall device 51 and/or one or more firewalls or security isolation mechanisms located in and implemented by any or all of the server and computer devices 12 and 13 connected to the network 50. Importantly, a data analytics machine 52 is communicatively connected to the secondary network 50 and thus to the various devices 12 and 13 so as to be, in essence, isolated from the primary control communications network 30 from a security standpoint. The data analytics machine 52 may be any type of computer or processing device having a memory 54 and a processor 56, wherein the memory 54 stores, and the processor 56 executes, one or more data analytic routines and/or applications that perform data analytics with respect to one or more batch or continuous processes being implemented by or on the primary control system 30, including for example, on-line or off-line data analytics for the primary or on-line control network 30. While the secondary communications network 50 is illustrated as using a hardwired communications network, the secondary communications network 50 could include or instead be implemented as a wireless communications network using any desired wireless communications protocol and/or hardware and could be connected to the primary communications network 30 via either hardwired or wireless communications.

As indicated by the expanded block 59 in FIG. 1, the data analytics machine 52 may include a data analytics engine 60 coupled to a logic engine 62. As will be discussed in more detail below, the data analytics engine 60 may include a data analytics or modeling interface for use in creating or forming one or more data analytic models that can be used to perform on-line or off-line data analytics, a memory for storing the one or more models for performing the data analytics, and a data analytics execution engine for executing the one or more data analytic models in conjunction with the operation of the process control system 10 connected to the primary communications network 30 to perform data analytics with respect to the operation of the process control network 10, such as making predictions of process variables within the process or of quality variables of products being produced by the process, recommendations for changes to the process control system 10, analysis of process performance, etc. Still further, the logic engine 62, which may be partially or entirely made up of a simulated control system module, may simulate or track the operation of the process control system 10 as implemented via the primary communications network 30 (or any relevant portions thereof) to collect and/or develop on-line parameter or variable values for the process control system 10 for use by the data analytics engine 60 in performing on-line data analytics. If desired, the simulated control system module include the same or a different version of the on-line process control network 30 and may even be formed using the same or different type of process control system software as used in the on-line process control network 30. In this manner, the simulated process control system or module may simulate the operation of the on-line process control network 30 with the same or different (e.g., advanced) capabilities to thereby simulate the operation of a control network being tested for operation in the on-line control network 30 or having capabilities not provided in the on-line process control network 30.

To support the data analytics engine 60 during on-line or, in some cases, off-line operations, a communication module 65 is disposed in one of the computer devices or servers 13 and operates to collect or read various process variable values and other process information from process control network 10 as connected to the primary communications network 30 and further operates to deliver these values to the data analytics machine 52 via the secondary communications network 50 for use by the data analytics engine 60 and/or the logic engine 62 in performing on-line or off-line data analytics. The communication module 65, which is particularly described herein as being a data collection device in the form of an open process control (OPC) server, could be any type of system or module for reading and collecting information from the devices associated with or connected to the primary process communications network 30, including from the controllers 11A and 11B, the data historian 12, the field devices 15-27, the computers 13 or any other device in the primary communications network 30, in a read-only manner. The communications module or data collection device 65 is also connected to the secondary communications network 50 and operates to provide the process plant data to one or more users or devices on the secondary network 50. The communications module 65 may collect and send process variable data on a variable by variable basis (as is typically the case with OPC devices) or may collect and send this data in, for example, web pages, using an HTML based protocol, for example.

Generally speaking, the communications module 65 may be implemented as an OPC server, which is a software application that acts as an application programming interface (API) or a protocol converter that generally connects to a device such as a controller, a data historian, etc. and that operates to translate the data from the device into a standard-based OPC format. The OPC protocol, which is managed by the OPC Foundation, is an industry standard created with the collaboration of a number of leading worldwide automation hardware and software suppliers, working in cooperation with Microsoft®. The standard defines methods for exchanging real-time automation data between PC-based clients. Thus, OPC uses a well-known methodology for mirroring or providing data access between various different types of, for example, proprietary networks, to enable data capture, importation and communication between different networks, such as different networks having different data structures, protocols, etc. OPC compliant applications such as human machine interface, historian, spreadsheet, trending, etc. applications can connect to the OPC server and use this sever to read (and in some cases write) device data. While the communications module 65 is illustrated as being located in one of the computer devices 30, it could instead be located in any other device on the primary communications network 30 such as in the firewall device 51, the historian 12 or, as is commonly the case, a stand-alone device or server.

Referring again to the data analytics machine 52 of FIG. 1, the data analytics engine 60 thereof may include one or more process analysis routines stored in the memory 54 to be executed by the processor 56. While the data analytics engine 60 and the logic engine 62 are illustrated as being stored in a single computer readable memory and executed on a single processor of the machine 52, the data analytics engine 60 and the logic engine 62 could be stored in more than one memory and/or could be executed in more than one processor, which memories and processors may be located in the same or different devices. Generally speaking, the data analytics engine 60 and thus the process analysis routines executed by the engine 60 are communicatively coupled (via, for example, the OPC server 65) to one or more control routines such as the control routines 42, 44, 46, to the data historian 12, and/or to one or more applications within the primary communications network 30 to receive one or more process variable measurements, control signals, configuration data, and/or other measured or generated data values within the primary communications network 30. However, in this case, the data analytics engine 60 only receives data or information that the process control system 10 has been configured to collect as part of the process control system operation. However, one or more model building routines of the data analytics engine 60 may use this data to develop one or more statistical process models or other models that may be used to analyze an on-going or on-line batch or continuous process. The data analytics engine 60 may then execute these models on-line, again using data from the OPC server regarding the operation of the on-line process, as the process is running, to produce predictions of process variable values within the process, to analyze cause and effect relationships within the process, to predict quality characteristics for products or outputs being produced by the process, to suggest or recommend changes to the process to optimize the process, etc. The data analysis routines of the data analytics engine 60 may also display information to users, such as process operators, regarding the on-line or on-going process as being implemented by the process control system 10, make recommendations for changes to the control system or to the process to enable the process to operate more efficiently, to increase the quality of the product being manufactured within the plant 10, etc.

In one example, the data analytics engine 60 may implement any or all of the data analysis routines described in more detail in U.S. Patent Application Publication No. 2010/0318934, which describes a process analysis machine that enables an operator or other user to detect and determine the cause of process quality degradations or variations within a process and to thereby enable a user or operator to change the plant to eliminate or reduce the quality or degradation issues. Still further, the data analytics engine 60 may use the techniques described in U.S. Patent Application Publication No. 2011/0288660 to build one or more process models for use in modeling a process, such as a batch process, to produce predictions of process variables, such as product quality or final output quality variables. In particular, this publication describes a methodology for building one or more process models for use in a data analytics engine of a batch process and then using these models to analyze the on-going or on-line operation of subsequent batch runs of the process. More particularly, this publication describes a method of collecting data and aligning collected data from various different batch runs of a process for use in creating a model, wherein the data alignment is based on detecting the starting and stopping of various events within the batch process, such as various stages, procedures, operations, etc. of the batch process, and then creating process models for the batch process from the aligned data. Thereafter, data from an on-line batch can be analyzed by aligning data collected from this batch process with the aligned model data, running PLS, PCA and/or other statistical data analysis methods on the aligned data using the process models to determine the manner in which the current or on-line batch compares with the statistical model, to make predictions of process variables or quality variable of products, and to provide a computational engine for the analyses described above for user interface operations. Still further, the data analytics engine 60 may use the techniques described in U.S. Patent Application Publication No. 2011/0288837 which describes a further data analysis routine and model building routine that divides the process into a set of stages and performs on-line data analysis using PLS, PCA and other process models based on the stages as so defined. Likewise, the data analytics engine 60 may use the techniques described in U.S. Patent Application Publication No. 2013/0069792 which describes a system that models a batch or continuous manufacturing process using a model developed in a manner that accounts for different process states, such as process throughput ranges, and alters or tunes the model used in the data analytics based on the current process state.

Figure 2:
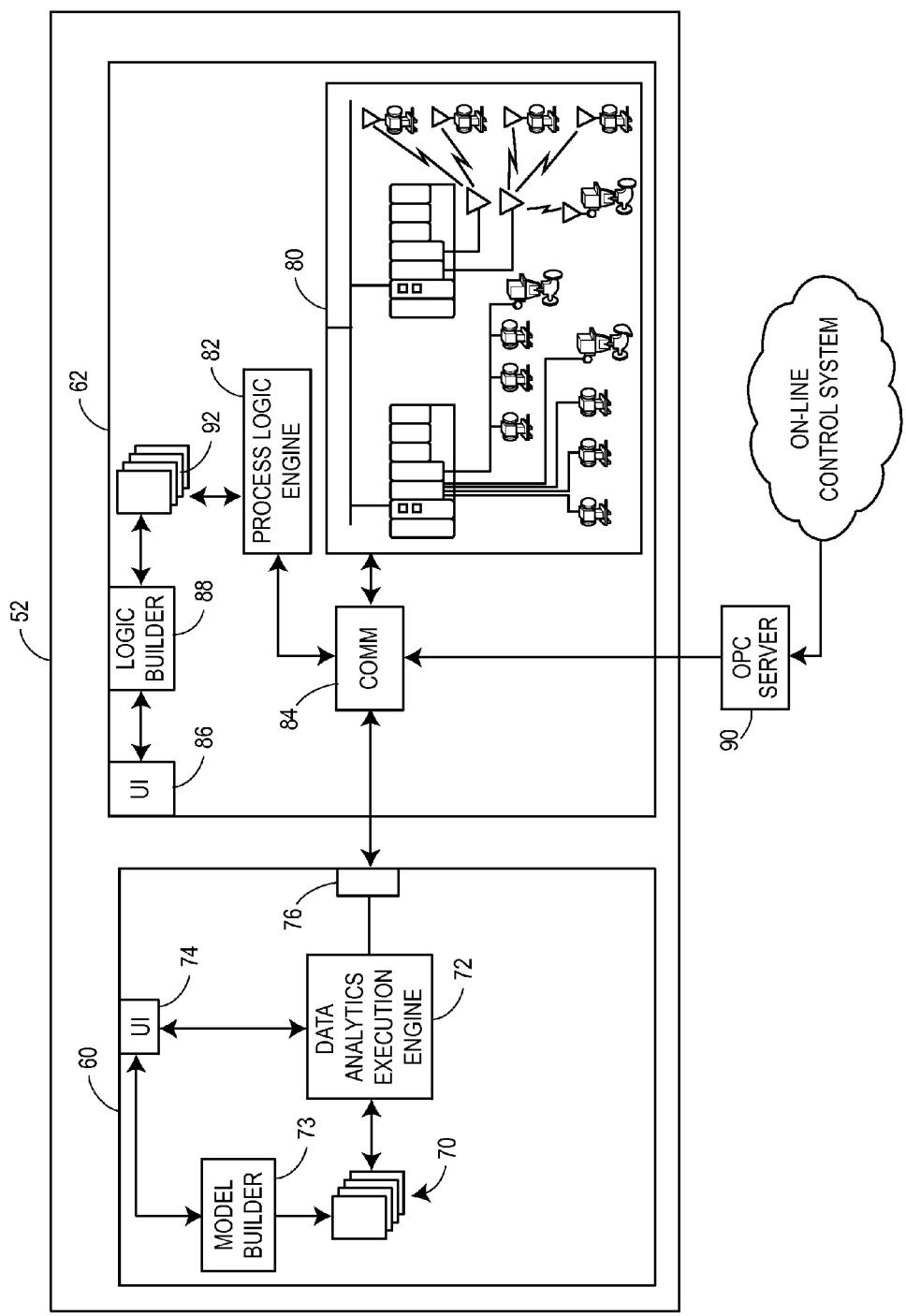
FIG. 2 is a block diagram illustrating an example of a non-intrusively implemented data analytics machine having a data analytic engine and a logic engine in the form of a simulated process control system.

Referring now to FIG. 2, one example of the data analytics machine 52 including the data analytics engine 60 and the logic engine 62 of FIG. 1 is illustrated in more detail. In particular, as illustrated in FIG. 2, the data analytics engine 60 includes a set of data analysis or analytic models or routines 70 stored in a memory, a data analytics (DA) execution or runtime engine 72, a model creation or builder engine 73, a user interface (UI) 74, and a communication interface 76 which may be, for example, a communication stack associated with any desired communication protocol or protocols. The models or routines 70 are created by users or model builders using, for example, the model builder engine 73 and the UI 74 or may be imported from other sources. Generally speaking, the models or routines 70 include or use data analysis models, such as statistically based predictive models developed in any desired manner, to model or reflect the current operating characteristics of the process plant 10 as compared to the operation of a statistically acceptable or modeled process run. The runtime or execution engine 72 may execute one or more of the models or routines 70 on-line, i.e., during operation of the process control network 10, using the various models or routines 70 at appropriate times to model the current operation of the process control network 10 or portions thereof to produce predictions, such as predictions of product quality or output quality of the product being produced by the plant, predictions of current or future process variable values, etc. The outputs of the runtime engine 72 may be used to perform any other desired analysis of or within the plant 10. For example, the runtime engine 72 may analyze the operation of the plant 10 using any desired analysis methodology. In a particular example, the runtime engine 72 may operate as the data analytics engine in the system described in U.S. Patent Application Publication No. 2010/0318934 or any of the other publications noted above to estimate or predict product variable values or product quality values, to determine and allow users to view the contribution of various parameters to the predicted output variations or quality, to run simulations of plant operation based on variations to one or more control parameters, etc. In some cases, the runtime engine 72 may make predictions of the product quality to be output by a currently running batch process being implemented by the process control network 10, or to predict process variable values of the process control network 10, and to provide such predictions and quality variable values to a user, such as an operator, via the UI 74 using the data analysis models and techniques described in these publications. The operator may then use these predictions to alter control of the process 10, via one or more of the controllers 11A or 11B, to produce a product having better quality characteristics. Examples of such user interfaces are described in detail the U.S. Patent Application Publication No. 2010/0318934, for example. Still further, methods of developing process modules for use in a data analytics engine are described in U.S. Patent Application Publication Nos. 2011/0288660, 2011/0288837 and 2013/0069792, the entire disclosures of which are hereby expressly incorporated by reference herein.

Importantly, during operation, the runtime engine 72 communicates via the communication interface 76 with the logic engine 62 to obtain the data necessary for running or implementing the models 70, as appropriate, to thereby make on-line predictions and quality assessments or to provide other on-line analyses. As illustrated in FIG. 2, the logic engine 62 includes a simulated control network 80, a process logic engine 82, a communication block 84 for communicating with the actual process control network 10, a UI interface 86 and a logic builder application 88. In one case, the simulated control network 80 may be a control system simulation configured to simulate the operation of the control network 10 illustrated in FIG. 1. In this case, the simulated control network 80 includes some or all the components of the actual control network 10 ported over into the simulation 80, so that the simulated control network 80 simulates some or all of the process variable values. While the simulated control network 80 may be configured or implemented using the same software modules as implemented in the actual control network 10, the simulated control network may be a different version of such a control network (having different features, for example), or may even be a different type of control network altogether. In this manner, the data analytics system 52 may use a different type of control system to simulate the operation of the actual process control network being modeled, if so desired.

Generally speaking, the simulated control network 80 includes or uses the configuration values associated with the actual control network 10 as needed by the models 70, and mimics or stores the interconnections between those process variables, configuration variables, etc. within the process plant 10 as currently configured. As a result, the simulated control network 80 includes some or all the process variables, configuration variables, connection variables, user-interface variables, etc. that are associated with and used by the actual process plant 10 as configured.

As will be understood, the communication block 84 illustrated in FIG. 2 obtains or reads the actual process plant data or information from the process plant 10 to obtain current values of process variables, control signals, alarms and alerts, etc. sent by or used in the actual process plant 10, configuration parameters as changed within the plant 10, etc. and provides these values to the simulated control system 80. In one case, these process variables, control and plant configuration variables, etc. may be obtained using an open protocol data acquisition device 90, which may be the OPC server 65 of FIG. 1 disposed within the computer device 13 located on the primary communications network 30 of FIG. 1. Here, the data acquisition device 90 may communicate directly with the historian 12 within the process plant 10 and/or with actual physical devices within the plant 10, such as the controllers 11A and 11B, the field devices 15-27, control modules, such as function blocks or control modules 42, 44, 46, etc., within the plant devices and provides the collected information to the logic engine 62 and, more particularly to the simulated control network 80 of the logic engine 62. As an example, an OPC server 90 may be connected within the primary communications network 30 of FIG. 1 to read or otherwise obtain the current values of various process variables, control variables, configuration parameters, alarms, alerts, messages, etc., as these values exist within the process plant 10 and may operate to provide these values to the simulated control system 80, which may simply mirror these values within the simulated control network 80 as part of the simulation.

Of course, the OPC server 90 of FIG. 2 may be any standard OPC network server that is configured prior to or along with the plant 10 (as is generally done within plants) to provide access to various values within the plant 10, via the historian 12, via the actual devices in the plant 10, or both, as is well known. Here, the OPC device 90 acts as or implements a firewall between the data analytics system 52 and the primary communications network 30 of FIG. 1. As such the OPC device 90 may perform only read-only operations within the primary communications network 30 without performing any write operations in that network. The use of the OPC server 90 or any other similar on-line plant data acquisition device enables the data analytics engine 60 and the logic engine 62 to be connected to the plant 10 without needing to reconfigure the plant network 10 and without needing to recertify the plant network 10.

As will be understood, the simulated process control network 80 may store data as obtained from the plant 10 for each of the process variables and other variables that have been programmed to be read or obtained by the OPC server 90 and enable access to these variable values as needed by the on-line diagnostics or analytics engine 72. Of course, the OPC server 90 operates during runtime of the plant 10 to collect new variable values and to update the variable or parameter values within the simulated control network 80 as those new variable values are generated within the plant. Thus, the OPC server 90 operates to make variable and parameter values within the plant 10 immediately available or accessible to the logic engine 62 and thus to the runtime engine 72, as if the diagnostics runtime engine 72 was actually connected to the process plant 10 and measuring or obtaining these variable values directly from the plant 10.

However, in many cases, the runtime engine 72 and/or the models 70 used by the run-time engine 72 need to have access to various variable values, parameter values or other information that is not collected by the OPC server 90, because the OPC server 90 was not initially set up to collect that data or because that data is not generated or cannot be collected directly within the process plant 10. Examples of such variable or parameter values include recognizing changes of stages or states within a process, such as when stages, phases, procedures, unit phase procedures, etc. begin or end within a process, the changes of state based on the value of a state parameter within the process, etc. Of course, such variables or parameters may be estimates of process variables not measured by or collected within the process plant 10, or other data or information that is not measured, collected or otherwise available to the OPC server 90. In this case, the process logic engine 82 executes one or more further process logic modules 92, which may be configured or developed by an operator or configuration engineer for example using the logic builder application 88 and the UI 86. The process logic modules 92 operate within the process logic engine 82 using at least some of the plant data as developed or collected by the OPC sever 90 or as otherwise determined by or stored within the process simulation system 80, to calculate the additional variable values or data needed by the runtime engine 72 or by the models 70, as part of the operation of the runtime engine 72.

Thus, for example, in one case, one of the process logic modules 92 may operate on the process plant data, as simulated by or retained within the process simulation system 80, to detect the change of a batch stage, or the change from one batch phase or procedure to another batch phase or procedure of a batch process. The detection of such a change in a batch stage or batch phase or procedure may be needed to enable the runtime engine 72 to know to execute a new model 70 or to collect data for use in a new model 70 for that phase or stage or procedure of the batch process being implemented on-line in the plant 10. In this case, the change of a phase or stage or procedure of a batch may not be measured as such by the plant 10 or by the OPC server 90, nor might this action be specifically communicated to the OPC server 90 within the primary communications network 30. To compensate for this fact, one or more of the process logic modules 92 may be created for and executed to determine this information, which is never communicated as such from the on-line plant 10 and which may not, in fact, ever be detected or measured as such within the plant 10.

To enable this operation, the process logic engine 82 uses one or more of the process logic modules 92 to analyze other data, such as process variable data, configuration data, mode data, process control signal data, etc. that is collected from the plant 10 or that is provided by the plant simulation system 80 to recognize, based on process data associated with the control system and collected by the OPC server 90 or simulated by the process control simulation system 80, the end of a batch phase or stage, the beginning or start of a new batch phase, stage, or other transition point within a process, such as a batch process, the entry of the process into a new stage as determined by a state variable of a continuous or batch process, etc. The process logic engine 82 may be set up to detect this transition by running the process logic modules 92 based on data from the process simulation 80 and or data from the OPC server 90, for example, and may then communicate that transition data to the runtime engine 72 for use with the model 70 to perform process variable predictions and quality assessments, etc. on-line for the process being executed by the plant 10.

Examples of various types of process logic modules that may be created and used in the data analytics machine 52 and, more specifically, in the process logic engine 82, include logic routines or modules that detect transitions of process stages or states, such as batch process stage transitions, based on various information from the process. For example, in one case, a user or an operator may create a process logic module or routine that defines the beginning or ending of stages for model building. In particular, a logic module may be developed for defining when batch stages start and end in the process. Such a logic module may be used in developing models off-line (e.g., using data from previous batches as obtained from the data historian) and may then be used in or for on-line analytics to perform on-line analytics by recognizing batch stage transitions in the same manner. In this manner, the same stage definition rules could be used in the on-line batch analytics monitoring system as were used to create the model implemented by the batch analytics, to explicitly signal when batch stages start and end.

Of course, any number of control system conditions can be used to participate in defining stage or other process division start and end rules. For example, it is possible to define various process conditions and to gang conditions together in flexible manners as part of process logic modules or rules to create compound conditions. As an example, a first stage called "Stage 1" of a batch process might be defined as starting:

When Operation "Operation3b-1" started OR when Operation "Operation3b-1" ended AND when Process Parameter "PP1" becomes greater than 190 and then after 10 minutes has elapsed.

When, for example, a user or operator is defining stages for model building, zero or more batch or other process stages may be defined for each unit in the plant equipment hierarchy. Units with no stages defined may have no batch models generated or deployed in the data analytics machine 60.

Moreover, in one case, defining a stage for a unit (which is a group of equipment within the plant) may start with defining a stage name which may be, for example, a string of characters. Thereafter, for on-line batch analytics monitoring to be triggered, the stage name string must written to the batch analytics stage parameter in the corresponding unit module. Stage names defined for other units performing the same processing function in multi-path batches are quite likely to have the same stage name. In this case, it may be possible for the same stage name to appear more than once (in separate units) in multi-unit batches in user displays. In any event, multiple different types of stage events may be defined to identify various stage transitions or other types of events. Stage events may include, for example, a stage "starts on unit" event, a stage "ends on unit" event, a stage "in use" event, etc.

More particularly, a stage "starts on unit" event can be developed as a logic module to be applied during model building and during on-line data analytics. This definition can be defined as, for example, any of when: (1) a first recipe on the unit starts, (2) a unit procedure instance starts, (3) an operation instance starts, (4) a phase instance starts, (5) a phase instance ends, (6) an operation instance ends, or (7) a unit procedure instance ends, as examples.

In a similar manner, a stage "ends on unit" event, which can be applied during model building and during on-line data analytics, can be defined, for example, as any of or any combination of when (1) a unit procedure instance starts, (2) an operation instance starts, (3) a phase instance starts, (4) a phase instance ends, (5) an operation instance ends, (6) a unit procedure instance ends, or (6) a last recipe on unit ends.

Still further, stage definitions may be defined in various manners such as being defined so that a single Stage per Unit (in the equipment hierarchy) may be defined as a Stage name referred to as a "<Unit name> in use". Here, a Stage "starts on unit" event occurs when a first recipe on the unit starts and a Stage "ends on unit" event occurs when a last recipe on the unit ends. This set of stage definitions assumes that batch control actions on every unit in the equipment hierarchy should participate in batch analytics monitoring, and that a single stage per unit defines or provides an adequate granularity for the batch analytic models. Of course, other stage definitions may provide other stage granularity, including multiple stages per units defined based on other criteria, such as phases, unit phases, operations, etc. associated with the unit.

If desired, the logic engine 82 may enable a user or the data analytics engine to perform any number of stage definition actions on a unit such as (1) removing all stages, resulting in no stages being defined for the unit (which in turn means that a unit will not participate in batch analytics monitoring), (2) defining one stage per unit resulting in (returning to) the default stage configuration for the unit and (3) defining one stage per unit procedure in which, after selecting a reference candidate batch from those possible, the current stage definitions for this unit are replaced with a stage defined for each unit procedure that runs using this unit. Here, each unit procedure in a reference batch may be defined as (1) a stage name, e.g., "<Unit Procedure instance name>", (2) a stage "starts on unit" event, e.g., "<Unit Procedure instance name> starts" or (3) a stage "ends on unit" event, e.g., "<Unit Procedure instance name> ends."

Stages may also or instead defined in reference to operations. For example, it is possible to define one stage per operation on a unit. For example, after selecting a reference candidate batch from those loaded, the current stage definitions for the unit may be replaced with a stage defined for each operation that ran using this unit, where for each operation found in the reference batch the stage may be defined as (1) a stage name, e.g., "<Operation instance name>", (2) a stage "starts on unit" event, e.g., "<Operation instance name> starts" or (3) a stage "ends on unit" event, e.g., "<Operation instance name> ends".

Likewise, stages may also or instead defined in reference to phases. In this case, after selecting a reference candidate batch, the current stage definitions for the unit are replaced with a stage defined for each phase that ran using this unit, where for each phase found in the reference batch the stage is defined as (1) stage name, e.g., "<Phase instance name>", (2) a stage "starts on unit" event, e.g., "<Phase instance name> starts" and (3) a stage "ends on unit" event, e.g., "<Phase instance name> ends."

A user may also configure stages. In this case, after selecting a reference candidate batch from those loaded, a user may use the UI 74 to exert complete control over adding/deleting/editing the existing stage definitions for a unit. Moreover, for model building to work properly, stages defined on units must not overlap each other in time sequence. It is very desirable that the UI be programmed to point out stage overlap errors so that these errors can be corrected before leaving this configuration step.

Still further, to accommodate variations or changes to recipe and phase names over or between the training and testing batches used to build a model, the model builder application 73 can specify that any of up to a certain number (e.g., five) recipe/phase names may match in each stage "starts on unit" event and each Stage "ends on unit" event. For example, using a single reference batch, a stage "starts on unit" event might be determined as "PHASE_STEAM_HEAT:1-1"; Starts. However, this event cannot be resolved on some Training or Testing batches including those that instead used a Phase named PHASE_ELEC_HEAT. In this case, it will be possible to refine the stage start event as being equivalent to:

"PHASE_STEAM_HEAT:1-1"; Starts
 OR
"PHASE_ELEC_HEAT:1-1"; Starts.

The model building application may also provide a means to check for the presence of all stage start and end events across all of batches to be used for model building. For each training or testing batch, it should indicate (1) a Batch Id, and (2) a candidate batch Use: (Training or Testing). Ideally there is provided a means to change the Use (including to Ignore to disqualify a candidate batch with unresolvable stage events) if the stage start and end events could not be unambiguously resolved for each stage. Such a display could make it easy to find batches with missing Stage events (for being disqualified from model building). This display should also make it easy to see Stage definitions which do not work for many batches (suggesting a poorly chosen Stage definition event(s) for that Stage.) This display should also make it easy to see the Stage sequence found when cross-checking with the Training and Testing batches, and if there are any Stage overlap errors found in any batch.

To assist users in configuring their logic modules to set the expected stage name strings in the correct unit and stage parameters at the right times during batch execution, the model building application may provide a means to copy the current stage definitions (as plain text) to the Windows clipboard (for users to paste into an email, or a file to be printed or moved via USB drive, etc.)

In any event, once logic modules have been created to define workable stages and an expected stage sequence is derived, the model building application can provide a means to configure parameter usage by stage. In this case, the model building application can provide a means to specify which stages in the stage sequence should capture the value or use each ICP. During model building the first stage in the stage sequence that uses an ICP causes a value to be captured (from the OPC HDA server or imported data file) at the time of the start event for that stage, and subsequent stages in the stage sequence that are configured to use the same ICP use the value for the ICP as was captured by the earlier stage. In addition, the model building application may provide a means to specify which stages in the stage sequence should use each PP and provide a means to specify the stage(s) in the stage sequence that should produce each PQP (predicted) values.

In a similar manner, logic modules may be created to defined or generate other process variables, process transitions, process definitions, etc. that may be needed by a model or a routine 70 or by the runtime engine 72 in order to perform data analytics may be calculated as a function of variables that are received by, mirrored by or generated by the simulated control system 80. In this case, during the configuration of the data analytics engine 60, a user may create, enable or set up one or more new control logic modules 92 within the logic engine 62 to perform or calculate various parameters that are needed by the run-time engine 72 or the models 70, such as the determination of transition information that reflects transitions within batches, batch phases or other stage transitions, the calculation of process variables or other variable values that can be derived from process variables, control signals or other variable values collected by the OPC server 90 within the process plant 10, etc., to enable seamless operation of the data analytics engine 60, using the logic engine 62, all without having to reconfigure the actual plant 10 to get this information.

Thus, as will be understood, the data analytics engine 60 operates in conjunction with the logic engine 62 (in, for example, the form of a simulated control system and a process logic engine) to perform on-line data analytics for the process 10, but does so in a manner that enables the data analytics machine 52 to be added to or attached in parallel to the current process plant 10 without actually requiring any additional machines or software to be added within the primary or locked down portion of the plant 10, e.g., devices connected to the primary communications network 30, and without requiring the on-line plant network 30 or devices within the on-line plant network 30 to be reconfigured. This feature then enables the data analytics engine 60 to be added or attached to the plant 10 after the plant 10 has been configured, certified and locked down, but in a manner in which the data analytic engine operates to perform on-line data analytics for the plant 10 during runtime of the plant 10. This operation does not require reconfiguration of the process plant 10 and thus does not require the process plant 10 to be recertified upon the addition of the data analytics engine 60. Using this architecture thus enables data analytics engines to be easily added to and run with ongoing or currently running process plants to perform data analytics for those process plants, as well as to be temporarily attached to or run within a process plant to measure or tweak the running of the process plant, based on the collected analytic data, and then to be removed at a later time, all without recertification or changing the actual process plant control system. In fact, in these situations, all that is needed is that the process plant have an OPC or another data collection or access routine that is able to access the data within the process plant that is needed for the simulated control system, which is usually the case in most typical plant configurations.

Figure 3:
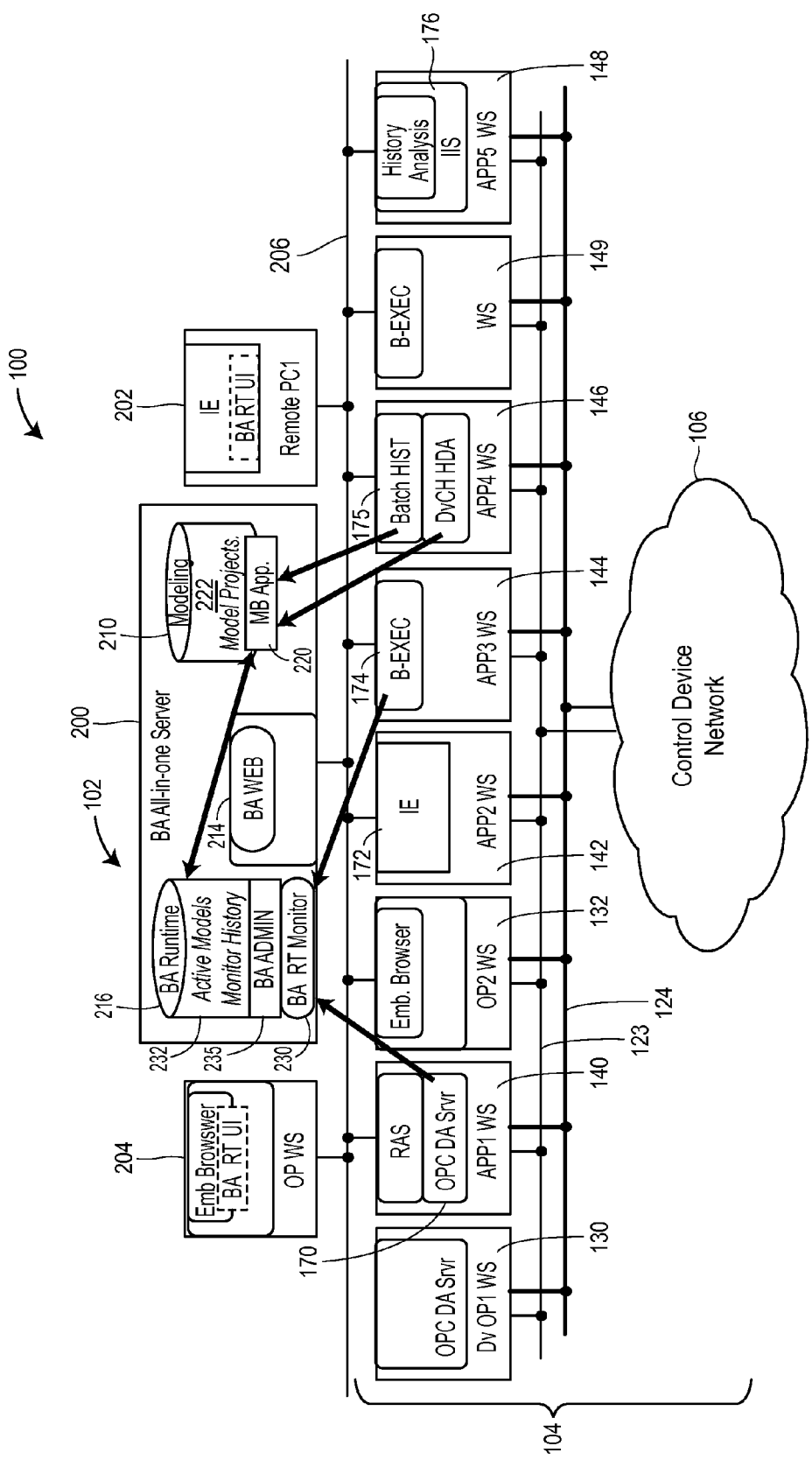
FIG. 3 is a data flow diagram of a process control system having a data analytics engine that is isolated from an on-line process control system but that operates on-line with respect to the operation of the process control system to perform on-line batch data analytics.

One example manner of non-intrusively connecting a data analytics machine to a process control network used to implement batch data analytics for batch processes is illustrated in FIG. 3. In particular, FIG. 3 depicts a data flow diagram for a process plant 100 having a data analytics engine 102 that is connected in a non-intrusive manner to an on-line process plant control system 104 to perform on-line batch data analytics for the batch process being implemented in the process control system 104. As illustrated in FIG. 3, the process control system 104 includes various plant devices or a device network 106 connected within a control system 104 and includes various computer devices connected to the device network 106 via, in this case, redundant, primary network buses 123 and 124 which may be, for example, Ethernet busses. In particular, the computer devices connected to the primary busses 123 and 124 include operator workstations 130, 132 and various application workstations 140, 142, 144, 146 and 148, as well as a higher-level workstation 149 which may execute higher level applications such as plant operation applications, business applications, maintenance applications, etc. In this case, the operator workstations 130, 132 operate to collect data from a plant control network or device network 106, which includes the field devices, controllers, I/O devices, etc. of FIG. 1, for example, and the workstations 130, 132 enable users to perform operator and management activities, such as viewing the current operation of the process, changing set points, setting up and running batch process runs, making control decisions, responding to alarms and alerts, taking maintenance actions, etc.

The application workstations 140, 142, 144, 146 and 148 store and execute different types of applications used in the plant to monitor, run or configure the device network 106. In this case, the application workstation 140 is illustrated as running an OPC data analytics server 170 (which may be the OPC server 51 or 90 of FIGS. 1 and 2, for example). The application workstation 142 is illustrated as running in Internet Explorer web browser application 172 and the application workstation 144 is illustrated as running a batch executive routine 174 which operates to spool and control the operation of batch runs within the device or plant network 106. As is known, a batch executive 174 typically runs or schedules batches to be executed within the process control plant system using various different control devices at different times to implement different batches, which may be part of a batch campaign. Still further, the application workstation 146 is illustrated as running a batch historian 175, which collects data from the plant network 106 about currently or previously run batches including process variables, control variables, and other data collected within or about the plant devices 106 during operation of those devices. Likewise, the application workstation 148 is illustrated as running a history analysis application 176, which may run local history analysis applications to generate historical data analysis as is commonly performed in process control networks. Still further, the advanced control system platform 149 is illustrated as storing and executing a second batch executive 174 for operating one or more of the batches within the plant network 106.

In this example, the computer devices 132, 140, 142, 144, 146, 148, and 149 are illustrated as including three network cards, wherein two of the network cards are used to connect these devices to the redundant communication networks 123 and 124 (part of the primary communication network 30 of FIG. 1), while a third network card is used to connect these devices to a batch analytics machine 200 and to one or more remote operator workstations or computers 202 and 204 via a communications bus 206. The use of the separate network cards enables the network bus 206 to be isolated from the network busses 123 and 124, and thus enables the data analytics machine 200 to be isolated from the plant network 106 from a security standpoint. In this manner, the data analytics machine 200 can be added to the plant 100 or removed from the plant 100 at any desired time without needing to reconfigure any of the control devices or applications connected to the primary busses 123, 124.

As illustrated in FIG. 3, the batch analytics machine 200 includes a batch modeling engine 210, a batch analytics engine 216 and a batch web application or interface 214. Generally speaking, the modeling engine 210 includes a batch model building application 220 and a library or storage 222. The batch model building application engine 220 may be used to create plant or batch models using the modeling library 222 to store on-going modeling projects. Here, a user may access the modeling engine 210 via explorers or web browsers within, for example, the remote computer devices 202 and 204 and may use the model building application 220 to develop models for batches using data from the batch historian 175 which stores data for previously run batches. Once the models are created, tested and ready to be run, these models may be provided to the batch analytics runtime engine 216 for use in analyzing the on-line batches being run within the plant network 106.

The batch runtime engine 216 includes a batch model execution engine 230, a set of batch models or routines stored in a memory 232 and a batch administration application 235. As will be understood, the batch runtime engine 216 stores and executes the active batch models being used to run analytics on the currently running batches within the process plant of device network 106 as well as the logic engine 62 of FIGS. 1 and 2. Here, a batch analytics engine 230 of FIG. 3 may include the plant simulation system 80 and logic models 92 associated with the logic engine 82 described in FIGS. 1 and 2. The batch analytics administration routine 235 interfaces with a user interface routine to provide information to a user via the user interface and to allow the user to change, view, etc. ongoing batch modeling and prediction activities. As illustrated in FIG. 3, the batch model execution engine 216 receives data from the on-line plant 104 via the OPC data sever 170 and the batch executive 174 to perform on-line data analytics, as described above.

During model creation, the modeling application 220 (which may include the model builder 73 of FIG. 2) may be accessed and used (executed) to develop one or more models for later use in the batch execution engine 216. The modeling engine 210 may also include the logic builder 88 of FIG. 2 and be used to create the logic modules 92 described with respect to FIG. 2 to calculate or determine additional plant parameters not provided by the OPC server 170 or the batch executive 174. The active models and modeling projects, which are created and stored by the batch modeling application 220 and which may be the models 70 of FIG. 2, are developed using data from previously run or executed batches as stored in the batch historian 175 and are provided to the batch runtime engine 230 when ready to be used to analyze an on-line batch run or process. In this case, the batch runtime engine 230 may implement the runtime engine 72 of FIG. 2, along with the models 70 of FIG. 2 and some or all of the logic engine 62 of FIG. 2. Moreover, the batch administration routine 235 may include the user interface application 74 of FIG. 2.

The batch web server 214 may be used to enable a user to browse the devices on the network 206 to obtain data needed at various times and to, for example, make changes to various devices on the primary networks 123 and 124 based on information developed by the batch analytics engine 200.

Importantly, the batch analytics machine 200 may be added to the network 206 of FIG. 3 at any time during operation of the plant 100, may be used to developed one or more batch analytic models based on data stored within the data historian 175 and other devices, and may then be operated to perform on-line analytics of the device network 106 while the network 106 is running to implement various batches or batch runs of the plant. The user may, at this time, try various different actions to change or alter batch runs to produce better products based on the on-line batch analytics and may, at some point, disconnect the batch data analytics machine 200 after optimizing the batch control routines or the device network 106. All of these activities may be performed without needing to reconfigure or re-certify the plant or device network 104 or 106, because all of the on-line data analytics were performed without needing to obtain any new information from the on-line plant network 104 (not already accessible to the OPC server 170 for example) and without having to change the plant configuration in any manner to support data collection for the addition of the machine 200. Likewise, the machine 200 can be removed from the plant 100 just as easily. Of course, it is the ability of the user or configuration engineer to mirror data from the plant in a process simulation that enables the data analytics engine 200 to operate as if it were connected directly to the on-line plant 104 or device network 106 to provide on-line diagnostics, and it is the use of the process logic modules that provide new data based on logic applied to plant data and information collected from the plant that enables the process simulation system to develop data and information not readily available from the on-line plant, as currently configured.

At least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as a magnetic medium (e.g., a magnetic disk or tape), a magneto-optical or optical medium such as an optical disk, or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification describes example methods, systems, and/or machine-accessible medium, the examples are not the only way to implement such systems, methods and machine-accessible medium. Therefore, although certain example methods, systems, and machine-accessible medium have been described herein, the scope of coverage of this patent is not limited thereto.

What is claimed is:

1. A system for use in analyzing an operation of process plant control equipment within a process plant while the process plant control equipment is operating on-line within the process plant to implement an industrial process, comprising:

a data collection device, coupled to the process plant control equipment via a communication network, configured to collect process variable data from the process plant control equipment as determined or measured within the industrial process while the industrial process is operating on-line by performing read-only operations on the communication network without performing any write operations on the communication network;

a process logic engine, communicatively coupled to the data collection device, configured to operate on a computer processor to simulate a portion of the operation of the industrial process in parallel with on-line operation of the industrial process in accordance with one or more process simulation models using the collected process variable data, and to produce one or more further process variable values based upon the portion of the operation of the industrial process that is simulated in accordance with the one or more process simulation models, such that the one or more further process variable values are generated while the industrial process is operating on-line using the one or more process simulation models and are not directly based upon data that is generated within the industrial process while the industrial process is operating on-line; and a data analytics engine communicatively coupled to the process logic engine, the data analytics engine including:

one or more stored data analytic models that statistically model the operation of the industrial process; and a data analytics execution engine configured to execute a data analytic routine using the one or more data analytic models while the industrial process is operating on-line to determine a predicted process variable for the industrial process using, as inputs to the data analytics execution engine, (i) some of the collected process variable data, and (ii) the one or more further process variable values produced by the process logic engine while the industrial process is operating on-line,
wherein the one or more process simulation models are different than the one or more stored data analytic models.

2. The system of claim 1, wherein the predicted process variable is a predicted process quality value.

3. The system of claim 1, wherein the process logic engine includes one or more process simulation models and a process simulation engine that executes on a processor to simulate the operation of the industrial process using the one or more process simulation models to produce the one or more further process variable values.

4. The system of claim 3, wherein the process simulation engine stores the collected process variable values as collected by the data collection device to simulate the operation of the industrial process.

5. The system of claim 1, wherein the industrial process is a batch process and the one or more data analytic models includes a batch model.

6. The system of claim 5, wherein the process logic engine includes a process model that determines the start or the stop of a batch defined by the batch model as one of the one or more further process variable values.

7. The system of claim 1, wherein the industrial process is a batch process, and
wherein the one or more data analytic models includes two or more stage models for modeling a particular batch process.

8. The system of claim 7, wherein the process logic engine includes a process model that determines the start or the stop of each of two or more stages associated with the two or more stage models as the one or more further process variable values.

9. The system of claim 1, wherein the industrial process is a batch process, and
wherein the one or more data analytic models includes two or more phase models for different phases of a batch for modeling a particular batch process.

10. The system of claim 9, wherein the process logic engine includes a process model that determines the start or the stop of each of two or more phases associated with the phase models as the one or more further process variable values.

11. The system of claim 1, wherein the data analytic models includes a projection to latent structures (PLS) model.

12. The system of claim 1, wherein the data collection device collects process variables in the form of measured process variables.

13. The system of claim 1, wherein the data collection device collects process variables in the form of control signals.

14. The system of claim 1, wherein the data collection device collects process variables in the form of alarms and alerts as generated within the industrial process.

15. The system of claim 1, further including a model builder engine that develops the one or more data analytic models from past process variable data collected from the industrial process for one or more previous industrial processes and further variable values as determined by the process logic engine for the one or more previous industrial processes.

16. The system of claim 1, wherein the process logic engine includes a process simulation engine that stores the current configuration of the process control equipment used in the industrial process.

17. The system of claim 1, wherein the process logic engine includes a logic builder engine that enables a user to develop one or more logic modules to be implemented on the process logic engine to determine the one or more further process variable values.

18. The system of claim 1, wherein the predicted process variables comprise one of an end-of-stage product quality and an end-of-batch product quality.

19. The system of claim 1, wherein the data collection device is an Open Platform Communication (OPC) data collection device.

20. A computer implemented method of analyzing an operation of process plant control equipment within a process plant while the process plant control equipment is operating on-line within the process plant to implement an industrial process, comprising:
collecting process variable data from the process plant control equipment via a communication network as determined or measured within the industrial process while the industrial process is operating on-line by performing read-only operations on the communication network without performing any write operations on the communication network;
using at least some of the collected process variable data to simulate the operation of the industrial process on a computer processor device in parallel with on-line operation of the industrial process in accordance with one or more process simulation models, and to produce one or more further process variable values based upon the portion of the operation of the industrial process that is simulated in accordance with the one or more process simulation models, such that the one or more further process variable values are generated while the industrial process is operating on-line using the one or more process simulation models and are not directly based upon data that is generated within the industrial process while the industrial process is operating on-line;
storing one or more data analytic models that statistically model the operation of the industrial process; and
using a computer processor to implement a data analytic routine using, as inputs to the one or more data analytic models, (i) at least a portion of the collected process variable data, and (ii) the one or more further process variable values while the industrial process is operating on-line produced via the one or more process simulation models, to determine a predicted process variable for the industrial process,
wherein the one or more process simulation models are different than the one or more data analytic models.

21. The computer implemented method of claim 20, wherein determining a predicted process variable for the industrial process includes determining the predicted process variable as a predicted process quality value.

22. The computer implemented method of claim 20, wherein determining a predicted process variable for the industrial process includes determining the predicted process variable value as one of an end-of-stage product quality and an end-of-batch product quality.

23. The computer implemented method of claim 20, wherein the process plant control equipment is associated with an initial configuration and an initial certification prior to the collection of the process variable data from the process plant control equipment, and wherein the initial configuration and the initial certification are unchanged upon collecting the process variable data from the process plant control equipment as determined or measured within the industrial process while the industrial process is operating on-line as a result of the read-only operations performed on the communication network by the data collection device.

24. The computer implemented method of claim 20, wherein collecting process variable data from the process plant control equipment as determined or measured within the industrial process while the industrial process is operating on-line includes collecting process variable data via a communications firewall.

25. The computer implemented method of claim 20, wherein using at least some of the collected process variable data to simulate the operation of the industrial process includes using one or more process logic routines that operate on the at least some of the collected process variable data to produce the one or more further process variable values.

26. The computer implemented method of claim 20, wherein using at least some of the collected process variable data to simulate the operation of the industrial process on a computer processor device to produce one or more further process variable values includes simulating the operation of the industrial process using one or more process simulation models.

27. The computer implemented method of claim 20, wherein the industrial process is a batch process, and wherein using a computer processor to implement a data analytic routine using one or more data analytic models includes using one more batch models, stage models, or phase models as the one or more data analytic models.

28. The computer implemented method of claim 27, wherein using at least some of the collected process variable data to simulate the operation of the industrial process on a computer processor device to produce one or more further process variable values includes determining the start or the stop of a batch, a stage, or a phase associated with a batch model, a stage model, or a phase model, as one of the one or more further process variable values.

29. The computer implemented method of claim 20, wherein using a computer processor to implement a data analytic routine using the one or more data analytic models includes using a projection to latent structures (PLS) model as one of the one or more data analytic models.

30. The computer implemented method of claim 20, further including enabling a user to develop, using a computer processor, the one or more data analytic models from past process variable data collected from the industrial process for one or more previous industrial processes and further variable values as determined for the one or more previous industrial processes.

31. The computer implemented method of claim 20, further including enabling a user to develop, using a computer processor, one or more logic modules to be implemented on a computer processor to determine the one or more further process variable values.

32. A process control system for use in controlling an industrial process, comprising:

process plant control equipment including a controller and one or more field devices which implement an industrial process;

a data collection device, communicatively coupled to the process plant control equipment via a first communication network, configured to collect process variable data from the process plant control equipment as determined or measured within the industrial process while the industrial process is operating on-line by performing read-only operations on the first communication network without performing any write operations on the communication network, a process logic engine, communicatively coupled to the data collection device, configured to operate on a computer processor to simulate the operation of the industrial process in parallel with on-line operation of the industrial process in accordance with one or more process simulation models using some of the collected process variable data, and to produce one or more further process variable values based upon the portion of the operation of the industrial process that is simulated in accordance with the one or more process simulation models, such that the one or more further process variable values are generated while the industrial process is operating on-line using the one or more process simulation models and are not directly based upon data that is generated within the industrial process while the industrial process is operating on-line; and a data analytics engine communicatively coupled to the process logic engine, the data analytics engine including;

one or more stored data analytic models that statistically model the operation of the industrial process; and a data analytics execution engine that executes a data analytic routine using the one or more data analytic models while the industrial process is operating on-line to determine a predicted process variable for the industrial process using, as inputs to the data analytics execution engine, (i) a portion of the collected process variable data, and (ii) the one or more further process variable values produced by the process logic engine while the industrial process is operating on-line, wherein the one or more process simulation models are different than the one or more stored data analytic models.

33. The process control system of claim 32, wherein the process logic engine and the data analytics engine are each coupled to a second communications network, and further including one or more firewalls disposed between the first communications network and the second communications network.

34. The process control system of claim 33, wherein the data collection device is coupled to both the first and the second communications networks.

35. The process control system of claim 33, wherein the process plant control equipment includes a data historian, and wherein the data historian is connected to the first and the second communication networks and is adapted to store data generated by and received from devices coupled to the first communications network.

36. The process control system of claim 32, wherein the predicted process variable is a predicted process quality value.

37. The process control system of claim 32, wherein the process logic engine includes one or more process simulation models and a process simulation engine that executes on a processor to simulate the operation of the industrial process using the one or more process simulation models.

38. The process control system of claim 32, wherein the industrial process is a batch process and the one or more data analytic models includes a batch model, and
  wherein the process logic engine includes a process model that determines the start or the stop of a batch defined by the batch model as one of the one or more further process variable values.

39. The process control system of claim 32, wherein the data analytic models includes a projection to latent structures (PLS) model.

40. The process control system of claim 32, further including a model builder engine that develops the one or more data analytic models from past process variable data collected from the industrial process for one or more previous industrial process times and further variable values as determined by the process logic engine for the one or more previous industrial process times.

41. The process control system of claim 40, wherein the process logic engine includes a logic builder engine the enables a user to develop one or more logic modules to be implemented on the process logic engine to determine the one or more further process variable values.

42. The system of claim 1, wherein the one or more further process variable values are not collected within the process plant.

43. The computer implemented method of claim 20, wherein the one or more further process variable values are not collected within the process plant.

44. The process control system of claim 32, wherein the one or more further process variable values are not collected within the process plant.

45. The system of claim 1, wherein the process logic engine is configured to generate one or more simulated process variable values using the collected process variable data, and to produce the one or more further process variable values based upon the one or more simulated process variable values.

46. The computer implemented method of claim 20, wherein the act of producing the one or more further process variable values includes generating one or more simulated process variable values using the collected process variable data, and producing the one or more further process variable values based upon the one or more simulated process variable values.

47. The process control system of claim 32, wherein the process logic engine is configured to generate one or more simulated process variable values using the collected process variable data, and to produce the one or more further process variable values based upon the one or more simulated process variable values.

48. The system of claim 1, wherein the process plant control equipment is associated with an initial configuration and an initial certification prior to the process logic engine being communicatively coupled to the data collection device and the data analytics engine being communicatively coupled to the process logic engine, and
  wherein the initial configuration and the initial certification are unchanged upon the process logic engine being communicatively coupled to the data collection device and the data analytics engine being communicatively coupled to the process logic engine as a result of the read-only operations performed on the communication network by the data collection device.

49. The process control system of claim 32, wherein the process plant control equipment is associated with an initial configuration and an initial certification prior to the process logic engine being communicatively coupled to the data collection device and the data analytics engine being communicatively coupled to the process logic engine, and
  wherein the initial configuration and the initial certification are unchanged upon the process logic engine being communicatively coupled to the data collection device and the data analytics engine being communicatively coupled to the process logic engine as a result of the read-only operations performed on the first communication network by the data collection device.

50. The system of claim 1, further comprising:
  a user interface configured to display the predicted process variable for the industrial process; and
  a process controller configured to, upon receipt of a user input in response to the displayed predicted process variable, control the process plant control equipment to alter the industrial process, thereby improving quality characteristics associated with the industrial process.

51. The computer implemented method of claim 20, further comprising:
  displaying the predicted process variable for the industrial process; and
  upon receipt of a user input in response to the displayed predicted process variable, controlling the process plant control equipment to alter the industrial process, thereby improving quality characteristics associated with the industrial process.

52. The process control system of claim 32, further comprising:
  a user interface configured to display the predicted process variable for the industrial process,
  wherein the controller is further configured to, upon receipt of a user input in response to the displayed predicted process variable, control the one or more field devices to alter the industrial process, thereby improving quality characteristics associated with the industrial process.

* * * * *